Sept. 20, 1960 R. GLAVAN 2,952,897
METHOD OF MAKING FLANGE TYPE BEARING
Filed Nov. 21, 1957 2 Sheets-Sheet 1
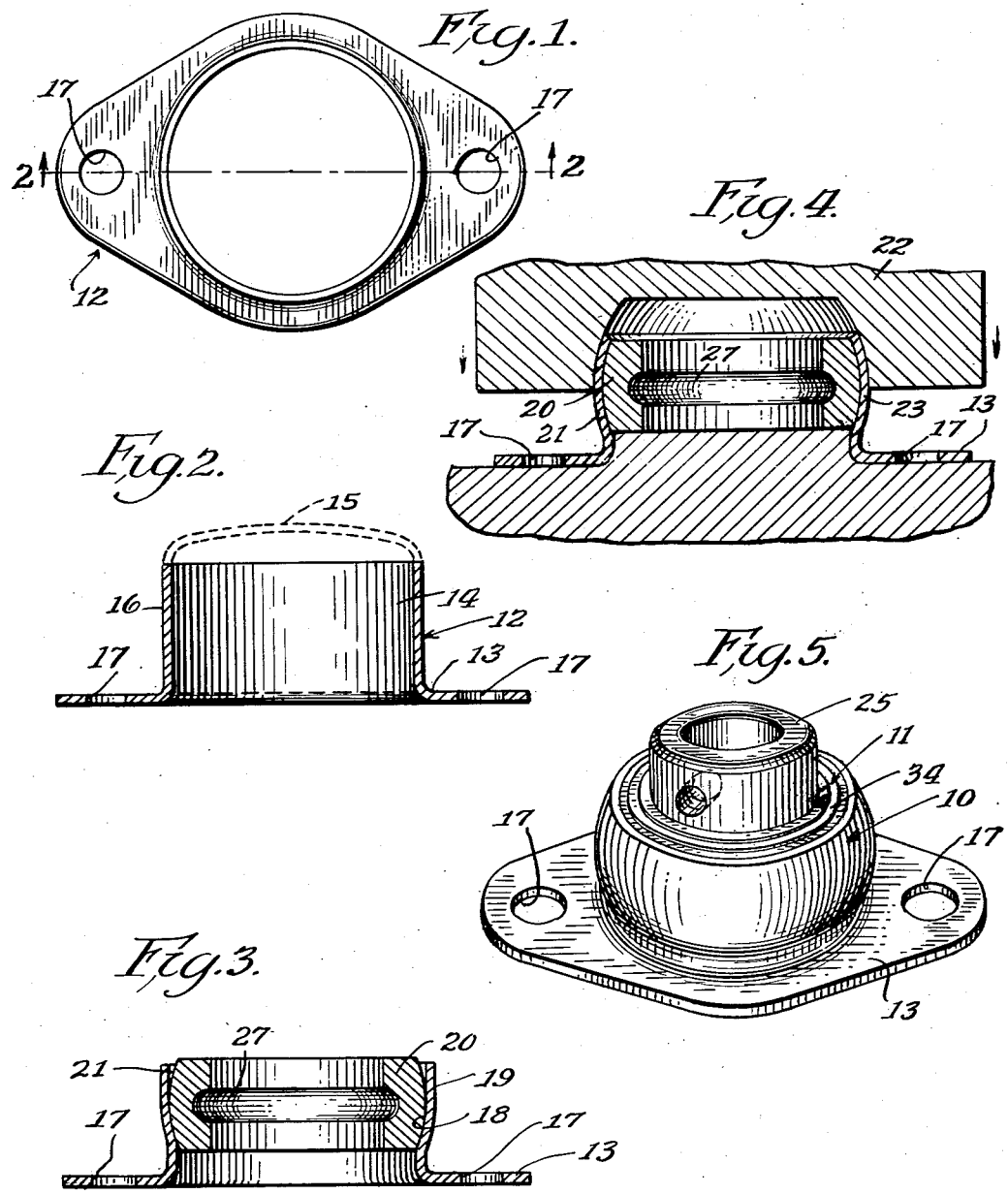
Inventor
Richard Glavan
By Mann, Brown and McWilliams
Attys

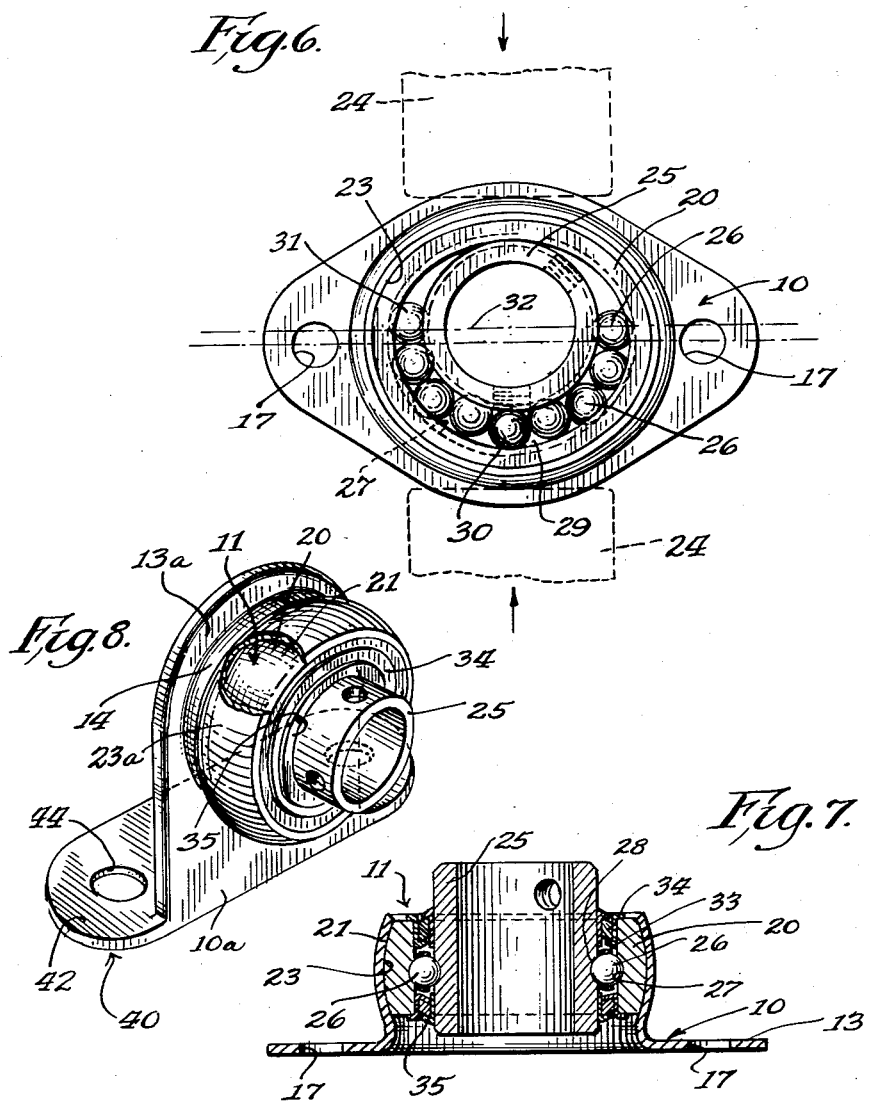

United States Patent Office 2,952,897
Patented Sept. 20, 1960

2,952,897

METHOD OF MAKING FLANGE TYPE BEARING

Richard Glavan, Joliet, Ill., assignor to Stephens-Adamson Mfg. Co., a corporation of Illinois Filed Nov. 21, 1957, Ser. No. 697,838

4 Claims. (Cl. 29—148.4)

This invention relates to an improved method for making a stamped flange type rolling bearing unit.

Bearing units of the type to which this invention relates are characterized by having their housings stamped or otherwise formed from sheet metal material and having associated therewith a mounting flange provided with suitable holes for receiving the mounting screws or bolts. This type or flange unit is to be distinguished from standard cast flange units.

The housings of stamped flange type bearing units are conventionally made in two pieces, particularly when they are of the externally self-aligning type which requires the housing to have an internal spherical surface coacting with a correspondingly shaped spherical outer surface of the bearing to provide the self-aligning feature. The two parts of the housing are clamped together over the bearing assembly and this is ordinarily done at the time of installation of the bearing unit.

There are some flange type bearings which have a single piece housing, but these are necessarily slotted to provide for the mounting of the bearing assembly within the housing. Noe Patent No. 2,794,691 may be considered typical of this type of bearing.

It is obvious that slotting of the bearing housing weakens the structure, and it is for that reason that housings for flange type bearing units have commonly been made in two parts which are clamped together over the bearing assembly.

The present invention provides a novel process for making a self-aligning stamped type flange bearing unit in which the housing of the bearing unit is in one piece and is characterized by the absence of mounting slots. The process also has other objects and advantages, including a substantial reduction in the costs of manufacture, greater convenience to the customer in applying the bearing unit to its ultimate use, and the production of a substantially superior bearing unit so far as performance is concerned.

Still other objects and advantages of the invention will become apparent as the disclosure proceeds and the disclosure is read in conjunction with the accompanying drawings, in which:

Figure 1 is a plan view showing a partially formed flange type bearing housing employed in practicing my novel method;

Figure 2 is a cross-sectional view taken on the line 2—2 of Figure 1 and indicating in dotted lines one step in my process;

Figure 3 is a sectional view showing other steps in my process;

Figure 4 is a sectional view illustrating how the bearing housing is formed over the outer race of the bearing;

Figure 5 is a perspective view showing a completed bearing unit;

Figure 6 is a somewhat diagrammatic plan view illustrating how the balls and inner race are mounted in the outer race after the latter has been encased within the housing;

Figure 7 is a sectional view showing the completed bearing with its housing; and Figure 8 illustrates a stamped pillow block bearing unit formed by employing my method.

The flange type bearing to be produced by my method is shown in Figure 5 and it comprises a housing, generally designated 10, and a bearing assembly, generally designated 11.

The first step in my process is to form a blank from sheet metal, such as shown at 12 in Figure 2, and this is accomplished by punching out a flange portion 13 of the blank and deep-drawing a cup having a cylindrical side wall 14 and a bottom 15 shown in phantom. The bottom of the cup is then removed so that the blank 12 comprises merely the bottom flange portion 13 and an upstanding cylindrical bearing supporting portion 16. Suitable holes 17 are punched in the flange portion for the reception of mounting screws or bolts.

After the blank has been formed, as shown in Figures 1 and 2, the bearing supporting portion 16 is enlarged by a suitable tool which also forms at the base of the bearing supporting portion a spherically-shaped seat 18 while still retaining the upper portion of the bearing supporting portion cylindrical, as indicated at 19. The tool for accomplishing this is inserted from the top of the cylinder 16 and may be either a punch, a spinning tool, or other known forming tool. The outer race 20 of the bearing is then dropped into the seat 18, this race being provided with a spherically-shaped outer surface 21 which conforms in radius to that of the seat 18.

The housing member 10, with the race 20 assembled therewithin, is then placed in position to receive a swaging die 22 (Figure 4), and this die, when closed, forms the remainder of the spherical supporting support 23 for the bearing. In the forming of the spherical support 23 for the bearing, the swaging pressure is controlled so that the race 20 is free to change its axial position within the housing, or, if necessary, the bearing may be freed by any of many known methods.

It should here be noted that the swaging operation which encases the outer race 20 within the housing 10 takes place prior to the completion of the bearing assembly 11, and experience has taught that if an attempt is made to swage the bearing assembly as a unit within the housing, the swaging operation is almost certain to cause Brinelling of the bearing.

The partially formed unit comprising the housing 10 with the outer race 20 completely encased within the spherical supporting portion 23 is then placed in a horizontal position between vise members 24 (Figure 6). The inner race 25 of the bearing assembly is then dropped in place against one side of the outer race 20, and the balls, generally designated 26, are then dropped in the crescent-shaped space 29 between the inner and outer races. The two races are preferably provided with deep ball bearing grooves, the one in the outer race being indicated at 27 and the one in the inner race being indicated at 28.

In order that the bearing may have maximum load capacity, it is desirable to insert one more ball than can normally be dropped into the crescent-shaped space 29, and this is accomplished by applying pressure to the vise members 24 to cause the bearing supporting portion 23 of the housing and the outer race 20 to become elliptical in shape, as shown in somewhat exaggerated form in Figure 6. The pressure applied to the vise members 24 is not sufficient to exceed the elastic limits of the materials involved, but the elongation of the bearing supporting portion 23 of the housing and outer race 20 permits an added ball which may be taken as a ball 30 to be forced downwardly into place, which has the effect of snapping an end ball, as for example the one shown at 31, above the center line 32 of the inner race. Once this is accomplished, pressure on the vise members 24 may be released, whereupon the housing and outer race spring back to normal shape and the inner race moves to a concentric position within the bearing. Thereafter retaining rings 33 are applied to keep the balls properly spaced around the bearing, and the usual sealing rings 34 and 35 may be applied. Of course, where load capacity is not a factor and fewer balls will serve the purpose, the lateral compression of the bearing supporting portion 23 and race 20, as shown in Figure 6, may be omitted.

The thus assembled bearing unit is characterized by a one-piece housing that has a bearing supporting area or portion that is of uniform width and continuous throughout its periphery. As a result, the bearing unit, as a whole, has maximum capacity to withstand thrust loads. The complete enclosure of the outer race also serves the added purpose of keeping the mated spherical surfaces of the housing and outer race clean, so that there is freedom of movement of the bearing assembly, as a whole, within the housing to provide the desired self-aligning feature of the bearing unit.

As may be seen from the above description of my method, the materials used in the construction of the housing are relatively inexpensive and the housing is applied to the bearing with a minimum of expensive machining operations. The method also lends itself to mass production procedures so that the method is very economical to use. The flange type bearing unit produced thereby is completely unitary and may be shipped from the factory in one part, thereby reducing packaging costs.

It will be obvious that my method is applicable to other types of bearing units that include a housing formed from materials such as those above specified, as illustrated by Figure 8, which shows a pillow block bearing unit 40 produced by my method. Unit 40 includes a bearing assembly 11 mounted in seat 23a of stamped pillow block housing 10a that is formed from sheet metal, as by punching out flange portion 13a and integral base 42 and deep-drawing a cup having cylindrical side wall 14, the bottom of which is removed as described above. Base 42 is appropriately formed with bolt or screw holes 44. Seat 23a is formed and the outer race 20 applied thereto in the same manner as described above, and the bearing assembly completed as also described above.

Therefore, the term "flange type rolling bearing" as used in the appended claims is intended to mean all rolling bearings that include a housing formed from the materials specified above regardless of the particular manner in which the housing is shaped for purposes of mounting the unit in operating position.

The term "rolling bearing" as used in this specification and in the appended claims is intended to include all forms of bearing units in which one or more members or elements are rolled between inner and outer race members. This term is thus meant to include units employing single and multiple rows of balls, rollers, and the like, and thus is synonymous with the term "antifriction bearing" widely used in the bearing art and is to be distinguished from plain type bearings or bearing units.

The terms "bearing" and "bearing assembly" as used in this specification and in the appended claims are intended to mean the combination of the inner and outer race members and the rolling elements associated therewith, whether assembled or unassembled.

Various modifications of my method will appear to those skilled in the art, and they are intended to be included within the scope of the appended claims.

I claim:

1. The method of forming a flange type rolling bearing which includes the steps of taking a housing blank having a flange portion and a cylindrical portion integral therewith, enlarging the projecting end of said cylindrical portion and simultaneously forming same with an annular spherical seat, taking an outer bearing race and mounting same on said seat, deforming the enlarged part of said cylindrical portion about the outer surface of said race to lock the outer race within the housing, eccentrically mounting an inner race within the outer race to form a crescent shaped space between the outer and inner races, filling said crescent shaped space with rolling bearings until a rolling bearing is positioned adjacent the inner and outer races at each end of the crescent shaped space, and no further rolling bearings can be pressed into said space, compressing the deformed portion and outer race laterally thereof to give said outer race an elliptical configuration with its minor axis extending through the center of said crescent shaped space, and pressing a further rolling bearing into said space, whereby one of the rolling bearings at the ends of said space is forced past the center line of the inner race, releasing said deformed portion and said outer race, whereby said inner race is positioned concentrically within the outer race, with said rolling bearings positioned between said inner and outer races.

2. The method of making a ball bearing unit of the type in which a ball bearing, including an annular, one-piece outer race and an inner race with a series of balls interposed between the outer race and the inner race, is mounted in a stamped housing, with the periphery of the outer race being spherically contoured and coacting with a correspondingly shaped bearing seat in the housing, whereby the ball bearing is capable of self-alignment with respect to the housing, which method comprises: taking a sheet metal blank, deep drawing a cylindrical cup from the blank, thereby providing a circular upstanding cylindrical wall normal to the remaining flange portion of the blank, removing the closed end of said cup-shaped portion, leaving an upstanding cylindrical wall, then expanding the upper portion of the wall to a larger diameter and forming a part of said spherically contoured seat in the lower portion of said cylindrical wall adjacent to said flange portion, placing the outer race only of said ball bearing on said partially formed spherically contoured seat with the outer race having its periphery spherically contoured on a radius corresponding to that of the partially formed spherical seat in said cylindrical wall, deforming the upper portion of said cylindrical wall into conformity with the spherically contoured periphery of said outer race to complete the formation of said spherically contoured seat, then completing the ball bearing assembly by inserting the inner race within the outer race and biasing it toward one side of the outer race to thereby form a crescent-shaped space between the inner race and the outer race, introducing said balls into said crescent-shaped space, then centering the inner race and distributing the balls around the periphery thereof, and finally applying retaining means to hold the balls in properly spaced relation around the periphery of the inner race.

3. The method of making a ball bearing unit of the externally self-aligning type, said method comprising: first making a bearing housing and outer race sub-assembly by mounting an annular one-piece outer race having a spherically contoured periphery in a correspondingly contoured bearing seat in said housing, which seat is substantially continuous throughout its entire breadth and periphery, with the outer race thus mounted being firmly held within said housing but capable of self-aligning action with respect to the housing, and then completing the ball bearing assembly by inserting an inner race within said outer race and biasing it toward one side of the outer race to thereby form a crescent shaped space between the inner race and the outer race, introducing a plurality of balls into said crescent shaped space, then centering the inner race and distributing the balls around the periphery thereof, and finally applying retaining means to hold the balls in properly spaced relation around the periphery of the inner race.

4. The method as set forth in claim 3 in which at least a part of the bearing seat, is formed around the outer race while the outer race is supported within the housing, and in which the forming of said bearing seat or part thereof is accomplished by deforming a part of the housing substantially into contact with the spherically contoured periphery of the outer race.

References Cited in the file of this patent

UNITED STATES PATENTS

| | | |
|---|---|---|
| 1,668,105 | Crow | May 1, 1928 |
| 1,943,631 | Skillman | Jan. 16, 1934 |
| 2,383,727 | Lewis | Aug. 28, 1945 |
| 2,633,627 | Olmstead | Apr. 7, 1953 |
| 2,728,975 | Potter | Jan. 3, 1956 |